(12) United States Patent
Tsai

(10) Patent No.: US 11,644,041 B2
(45) Date of Patent: May 9, 2023

(54) SYSTEM AND METHOD FOR AUTOMATICALLY CORRECTING ROTATIONAL SPEED OF MOTOR OF FAN

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 27 days.

(21) Appl. No.: 17/401,762

(22) Filed: Aug. 13, 2021

(65) Prior Publication Data

US 2022/0381256 A1 Dec. 1, 2022

(30) Foreign Application Priority Data

May 26, 2021 (TW) ................................. 110119078

(51) Int. Cl.
| | | |
|---|---|---|
| *F04D 27/00* | (2006.01) | |
| *H02P 7/00* | (2016.01) | |
| *H02K 7/14* | (2006.01) | |
| *H02K 11/33* | (2016.01) | |
| *G06F 1/20* | (2006.01) | |

(52) U.S. Cl.
CPC ............. *F04D 27/004* (2013.01); *H02K 7/14* (2013.01); *H02K 11/33* (2016.01); *H02P 7/00* (2013.01); *G06F 1/203* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,276,392 A | * | 1/1994 | Beckerman | ............. H02P 25/04 |
| | | | | 318/774 |
| 2016/0226430 A1 | * | 8/2016 | Tachibana | .......... G03G 15/5004 |
| 2020/0284266 A1 | * | 9/2020 | Aoki | ....................... F04D 25/06 |

FOREIGN PATENT DOCUMENTS

CN 104391555 A * 3/2015 ......... F04D 27/0261

\* cited by examiner

*Primary Examiner* — Bickey Dhakal
(74) *Attorney, Agent, or Firm* — Li & Cai Intellectual Property (USA) Office

(57) ABSTRACT

A system and a method for automatically correcting a rotational speed of a motor of a fan are provided. After the fan is moved from an open space to a closed space, a sample and hold circuit samples and holds working periods of a driving signal by which the motor is driven to rotate at a first rotational speed as a first sampled working period, and a working period of a driving signal by which the motor is driven to rotate at a second rotational speed. An arithmetic circuit calculates a difference between the first sampled working period and a first reference working period, and a difference between the second sampled working period and a second reference working period. The arithmetic circuit calculates other working periods of driving signals by which the motor is driven to rotate at other rotational speeds based on the differences.

11 Claims, 11 Drawing Sheets

| Working period of PWM signal(%) | Target rotational speed (RPM) | Working period in open space(%) | Working period generated when air inlet is blocked(%) | Working period generated when air outlet is blocked(%) | Differences between Working Periods | Difference ratio of working period in open space to working period generated when air inlet is blocked(%) |
|---|---|---|---|---|---|---|
| 0 | 0 | 0 | 0 | 0 | 0 | 0 |
| 10 | 2000 | 14 | 14 | 14 | 0 | 0 |
| 20 | 4000 | 18.5 | 18.2 | 18.7 | 0.3 | 1.621621622 |
| 30 | 6000 | 22.5 | 21.4 | 22.6 | 1.1 | 4.888888889 |
| 40 | 8000 | 26.7 | 24.4 | 26.8 | 2.3 | 8.61423221 |
| 50 | 10000 | 31.7 | 28.3 | 31.7 | 3.4 | 10.72555205 |
| 60 | 12000 | 37.5 | 32.5 | 37.3 | 5 | 13.33333333 |
| 70 | 14000 | 43.9 | 37.5 | 43.8 | 6.4 | 14.5785877 |
| 80 | 16000 | 50.5 | 42.7 | 50.4 | 7.8 | 15.44554455 |
| 90 | 18000 | 58.5 | 48.9 | 58.2 | 9.6 | 16.41025641 |
| 100 | 20000 | 65.5 | 54.5 | 65.5 | 11 | 16.79389313 |

FIG. 6

SYSTEM AND METHOD FOR AUTOMATICALLY CORRECTING ROTATIONAL SPEED OF MOTOR OF FAN

CROSS-REFERENCE TO RELATED PATENT APPLICATION

This application claims the benefit of priority to Taiwan Patent Application No. 110119078, filed on May 26, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a system and a method for automatically correcting a rotational speed of a motor of a fan.

BACKGROUND OF THE DISCLOSURE

In electronic devices such as notebook computers, fans are used to cool heat generating components such as processors. If the heat generating components need to be cooled down by a fan, a rotational speed of a motor of the fan must be precisely controlled such that the fan can properly cool the heat generating components with an excellent efficiency. A proportional-integral-derivative controller (PID) system is often used to control the motor of the fan to rotate at a constant rotational speed. However, when a rotational speed command changes, a response time is required for the proportional-integral-derivative controller system to control the motor of the fan to rotate according to the changed speed command, which can result in an inrush waveform being generated in a rotational speed signal of the motor of the fan.

SUMMARY OF THE DISCLOSURE

In response to the above-referenced technical inadequacies, the present disclosure provides a system for automatically correcting a rotational speed of a motor of a fan. The system includes a lookup table module, a driver circuit, a sample and hold circuit and an arithmetic circuit. The lookup table module is configured to store a plurality of reference working periods respectively required for driving the motor of the fan to rotate at a plurality of reference rotational speeds in a first environment. The plurality of reference working periods include a first reference working period and a second reference working period that respectively correspond to a first reference rotational speed and a second reference rotational speed that are included in the plurality of reference rotational speeds. The driver circuit is connected to the lookup table module and the motor of the fan. The driver circuit is configured to look up one of the reference working periods that corresponds to the reference rotational speed being equal to a rotational speed instructed by a rotational speed command. The driver circuit is configured to output a driving signal having the one of the reference working periods that is looked up from the lookup table module to the motor of the fan. The sample and hold circuit is connected to the driver circuit and the motor of the fan. The sample and hold circuit is configured to sample and hold a working period of the driving signal by which the motor of the fan is driven to rotate at the first reference rotational speed in a second environment as a first sampled working period. The sample and hold circuit is configured to sample and hold a working period of the driving signal by which the motor of the fan is driven to rotate at the second reference rotational speed in the second environment as a second sampled working period. The arithmetic circuit is connected to the sample and hold circuit and the lookup table module. The arithmetic circuit is configured to calculate a difference between the first sampled working period and the first reference working period as a first difference, the arithmetic circuit is configured to calculate a difference between the second sampled working period and the second reference working period as a second difference. The arithmetic circuit is configured to determine a linearly changing relationship between the first difference and the second difference to analyze linearly changing data. The arithmetic circuit is configured to calculate the plurality of reference working periods respectively required for driving the motor of the fan to rotate at the plurality of reference rotational speeds in the second environment based on the linearly changing data. The arithmetic circuit is configured to update the lookup table module according to the reference working periods that are calculated.

In the embodiment, the arithmetic circuit is configured to generate a first equation according to the first difference and the first reference working period as follows:

$$y_1 = a \times x_1 + b,$$

wherein $y_1$ represents the first difference, $x_1$ represents the first reference working period, a represents a first coefficient, and b represents a second coefficient. The arithmetic circuit is configured to generate a second equation according to the second difference and the second working period as follows:

$$y_2 = a \times x_2 + b,$$

wherein $y_2$ represents the second difference, and $x_2$ represents the second reference working period. The arithmetic circuit is configured to subtract the second equation from the first equation to calculate the first coefficient, substitute the first coefficient into the first equation or the second equation to calculate the second coefficient, and generate a common equation based on the first coefficient and the second coefficient as follows:

$$y = a \times x + b,$$

wherein y represents a difference between the reference working period required in the first environment and the reference working period required in the second environment, and x represents the reference working period required in the first environment. The arithmetic circuit is configured to substitute each of the reference working periods respectively required for driving the motor of the fan to rotate at the reference rotational speeds in the first environment into the common equation to calculate each of the reference working periods respectively required for driving the motor of the fan to rotate at the reference rotational speeds in the second environment.

In the embodiment, the arithmetic circuit is configured to set the x's respectively at the plurality of reference rotational speeds as horizontal axis values of a curve diagram, set the y's respectively at the plurality of reference rotational speeds as vertical axis values of the curve diagram, and generate a linear curve in the curve diagram based on all of the x's and the y's at the plurality of reference rotational speeds.

In the embodiment, the working period of the driving signal by which the motor of the fan is driven to rotate at a same one of the reference rotational speeds is sampled by the sample and hold circuit sequentially at a first time point and a second time point. When the sample and hold circuit determines that the working period of the driving signal sampled at the first time point is not equal to the working period of the driving signal sampled at a second time point, the sample and hold circuit determines that an environment where the fan is located is changed and instructs the arithmetic circuit to update the lookup table module.

In the embodiment, the system further includes a stable state detecting circuit. The stable state detecting circuit is connected to the sample and hold circuit. The stable state detecting circuit is configured to time a first time length during which the motor of the fan stably and continually rotates at the first reference rotational speed. When the stable state detecting circuit determines that the first time length reaches a first preset time length, the stable state detecting circuit determines that the motor of the fan reaches a stable state and accordingly instructs the sample and hold circuit to sample and hold the first sampled working period. The stable state detecting circuit is configured to time a second time length during which the motor of the fan stably and continually rotates at the second reference rotational speed, and when the stable state detecting circuit determines that the second time length reaches a second preset time length, the stable state detecting circuit determines that the motor of the fan reaches the stable state and accordingly instructs the sample and hold circuit to sample and hold the second sampled working period.

In the embodiment, the first environment includes an open space, and the second environment includes a closed space in a case inside which the motor of the fan is located.

In addition, the present disclosure provides a method for automatically correcting a rotational speed of a motor of a fan, comprising the following steps: storing, in a lookup table, a plurality of reference working periods respectively required for driving the motor of the fan to rotate at a plurality of reference rotational speeds in a first environment, wherein the plurality of reference working periods include a first reference working period and a second reference working period that respectively correspond to a first reference rotational speed and a second reference rotational speed that are included in the plurality of reference rotational speeds; receiving a rotational speed command; in the first environment, looking up, from the lookup table, one of the reference working periods that corresponds to the reference rotational speed being equal to a rotational speed instructed by a rotational speed command, and outputting a driving signal having the one of the reference working periods that is looked up from the lookup table to the motor of the fan; sampling and holding a working period of the driving signal by which the motor of the fan is driven to rotate at the first reference rotational speed in a second environment as a first sampled working period; calculating a difference between the first sampled working period and the first reference working period as a first difference; sampling and holding a working period of the driving signal by which the motor of the fan is driven to rotate at the second reference rotational speed as a second sampled working period; calculating a difference between the second sampled working period and the second reference working period as a second difference; determining a linearly changing relationship between the first difference and the second difference to analyze linearly changing data; calculating, based on the linearly changing data, the plurality of reference working periods respectively required for driving the motor of the fan to rotate at the plurality of reference rotational speeds in the second environment, and updating the lookup table according to the plurality of reference working periods calculated; and in the second environment, looking up, from the lookup table that is updated, one of the reference working periods that corresponds to the reference rotational speed being equal to the rotational speed instructed by the rotational speed command, and outputting the driving signal having the one of the reference working periods that is looked up from the lookup table to the motor of the fan.

In the embodiment, the method further includes the following steps: generating a first equation according to the first difference and the first reference working period as follows:

$$y_1 = a \times x_1 + b,$$

wherein $y_1$ represents the first difference, $x_1$ represents the first reference working period, a represents a first coefficient, and b represents a second coefficient; generating a second equation according to the second difference and the second reference working period as follows:

$$y_2 = a \times x_2 + b,$$

wherein $y_2$ represents the second difference, and $x_2$ represents the second reference working period; subtracting the second equation from the first equation to calculate the first coefficient, substituting the first coefficient into the first equation or the second equation to calculate the second coefficient, and generating a common equation based on the first coefficient and the second coefficient as follows:

$$y = a \times x + b,$$

wherein y represents a difference between the reference working period required in the first environment and the reference working period required in the second environment, and x represents the reference working period required in the first environment; and substituting each of the reference working periods respectively required for driving the motor of the fan to rotate at the plurality of reference rotational speeds in the first environment into the common equation to calculate each of the reference working periods respectively required for driving the motor of the fan to rotate at the plurality of reference rotational speeds in the second environment.

In the embodiment, the method further includes the following steps: setting the x respectively at the plurality of reference rotational speeds as horizontal axis values of a curve diagram, setting the y respectively at the plurality of reference rotational speeds as vertical axis values of the curve diagram, and generating a linear curve in the curve diagram based on all of the x and the y at the plurality of reference rotational speeds.

In the embodiment, the method further includes the following steps: sampling and holding, at a first time point, the working period of the driving signal by which the motor of the fan is driven to rotate at one of the reference rotational speeds; sampling and holding, at a second time point, the working period of the driving signal by which the motor of the fan is driven to rotate at the one of the reference rotational speeds; and determining whether or not the working period sampled at the first time point is equal to the working period sampled at a second time point, in response to determining that the working period sampled at the first time point is not equal to the working period sampled at the second time point, determining that an environment where the fan is located is changed and instructing the arithmetic circuit to update the lookup table, and in response to determining that the working period sampled at the first time point is equal to the working period sampled at the second time point, not updating the lookup table.

In the embodiment, the method further includes the following steps: timing a first time length during which the motor of the fan stably and continually rotates at the first reference rotational speed; determining whether or not the first time length reaches a first preset time length, in response to determining that the first time length reaches the first preset time length, determining that the motor of the fan reaches a stable state, and sampling and holding the first sampled working period, and in response to determining that the first time length does not reach the first preset time length, re-timing the first time length; timing a second time length during which the motor of the fan stably and continually rotates at the second reference rotational speed; and determining whether or not the second time length reaches a second preset time length, in response to determining that the second time length reaches the second preset time length, determining that the motor of the fan reaches the stable state, and sampling and holding the second sampled working period, and in response to determining that the second time length does not reach the second preset time length, re-timing the second time length.

As described above, the present disclosure provides the system and the method for automatically correcting the rotational speed of the motor of the fan. When the fan is moved from one environment to another environment, the working periods of the driving signals respectively required for driving the motor of the fan to rotate at different rotational speeds are automatically corrected on the lookup table. Therefore, no matter where the fan is moved to, the corrected lookup table can be directly looked up according to the rotational speed instructed by the rotational speed command, and the driving signal having the working period looked up from the corrected lookup table is quickly outputted. The motor of the fan is driven to rotate at the target rotational speed by the driving signal.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 6 is a chart diagram of data simulated and tested by the system and the method for automatically correcting different rotational speeds of the motor of the fan in different environments according to the first and second embodiments of the present disclosure;

DETAILED DESCRIPTION OF THE EXEMPLARY EMBODIMENTS

Figure 1:
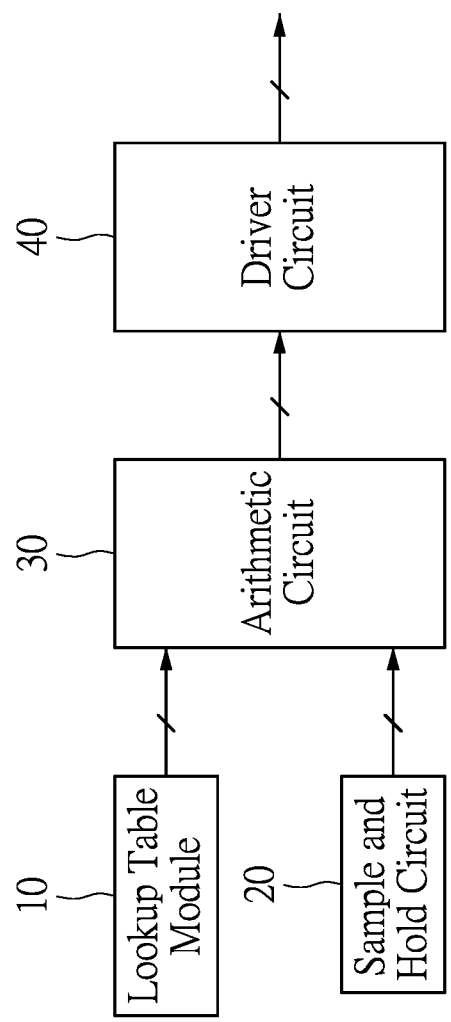
FIG. 1 is a block diagram of a system for automatically correcting a rotational speed of a motor of a fan according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be located upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
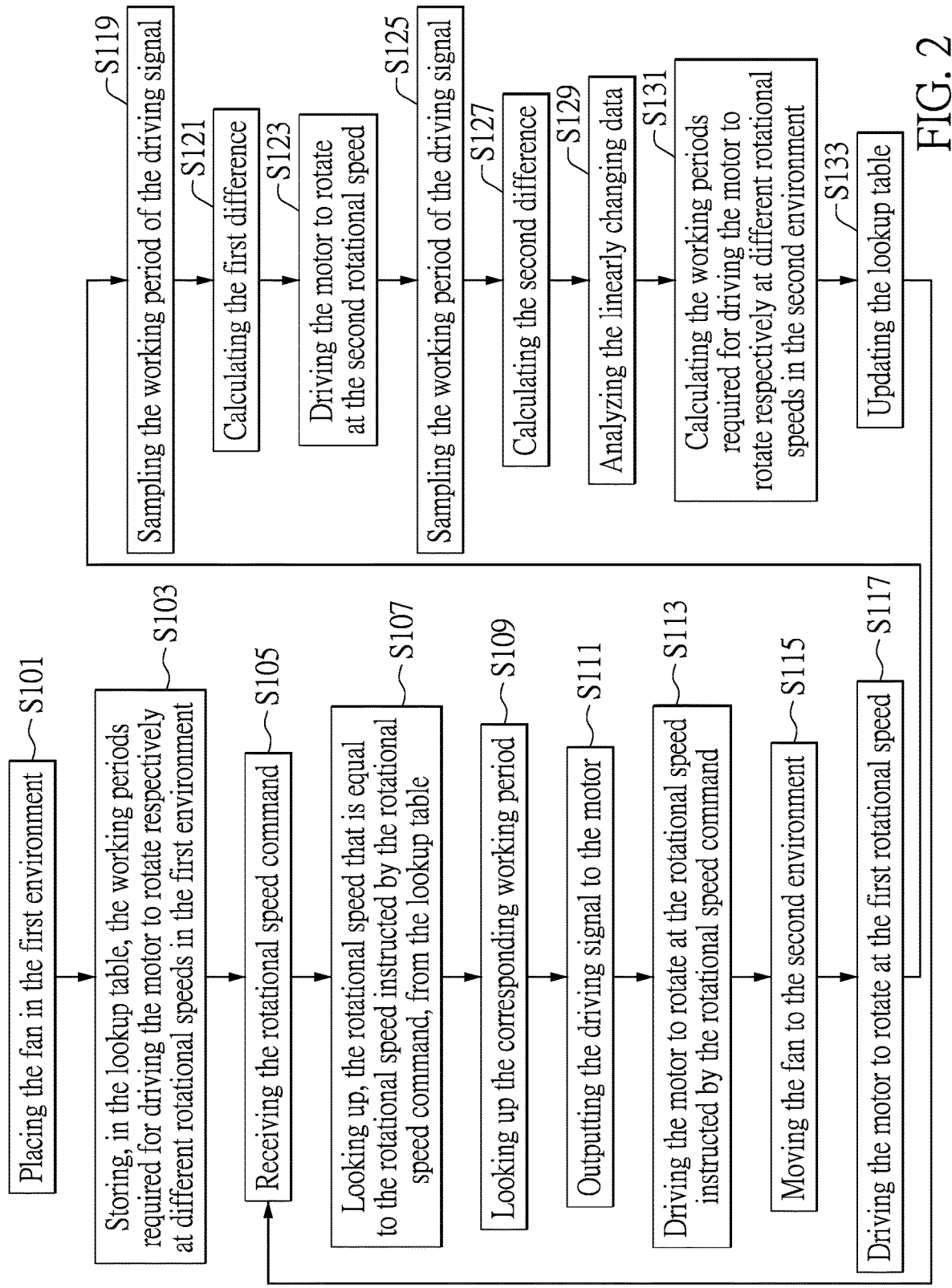
FIG. 2 is a flowchart diagram of a method according to the first embodiment of the present disclosure.
Figure 5:
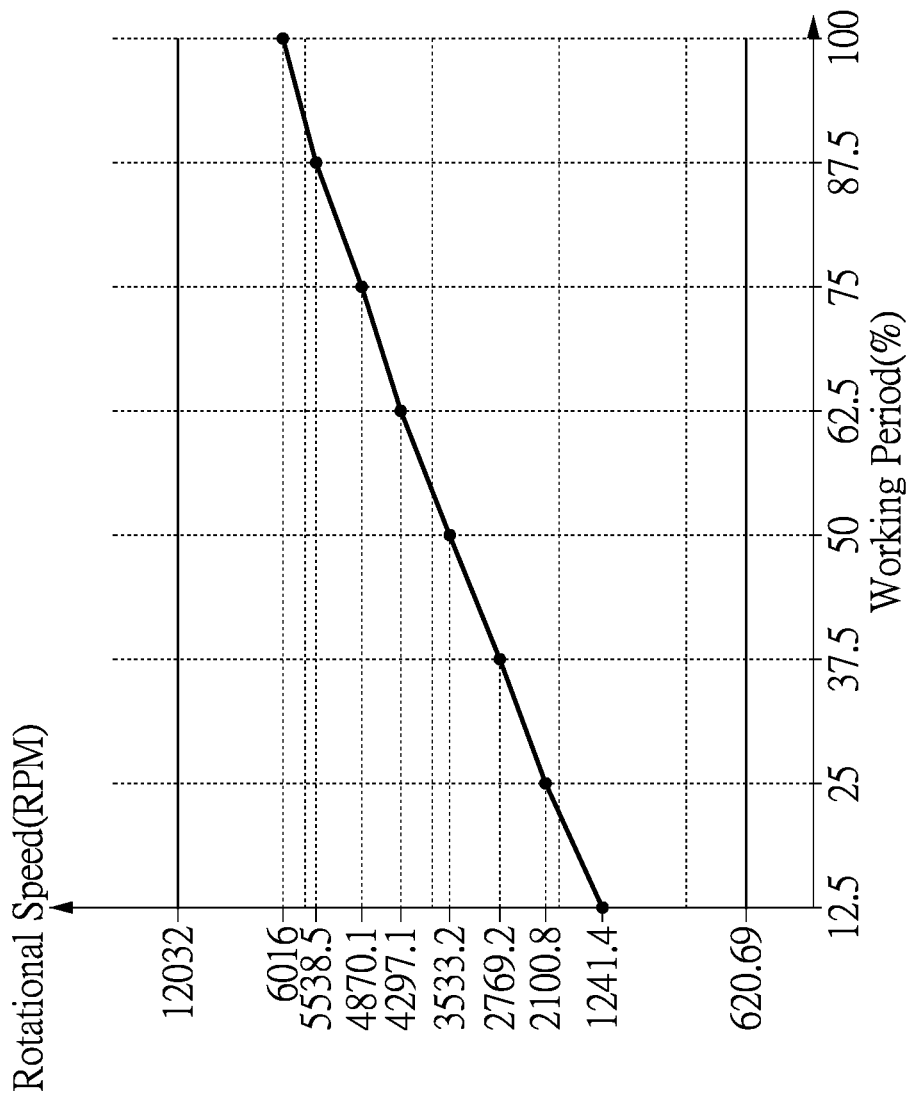
FIG. 5 is a curve diagram of rotational speeds stored in a lookup table of the system and the method for automatically correcting the rotational speed of the motor of the fan versus working periods stored in the lookup table according to the first and second embodiments of the present disclosure.

Reference is made to FIGS. 1, 2 and 5, in which FIG. 1 is a block diagram of a system for automatically correcting a rotational speed of a motor of a fan according to a first embodiment of the present disclosure, FIG. 2 is a flowchart diagram of a method according to the first embodiment of the present disclosure, and FIG. 5 is a curve diagram of rotational speeds stored in a lookup table of the system and the method for automatically correcting the rotational speed of the motor of the fan versus working periods stored in the lookup table according to the first and second embodiments of the present disclosure.

The system for automatically correcting the rotational speed of the motor of the fan includes a lookup table module 10, a sample and hold circuit 20, an arithmetic circuit 30 and a driver circuit 40 as shown in FIG. 1. The system is applicable to perform steps S101 to S133 of the method for automatically correcting the rotational speed of the motor of the fan as shown in FIG. 2. As shown in FIG. 1, the arithmetic circuit 30 is connected to the lookup table module 10, the sample and hold circuit 20 and the driver circuit 40.

In step S101, the fan in which the motor is disposed is located in a first environment.

In step S103, when the driver circuit 40 sequentially outputs driving signals to the motor of the fan to drive the motor of the fan to rotate respectively at a plurality of reference rotational speeds in the first environment, the plurality of working periods respectively of the driving signals are measured and listed on a lookup table that is established and stored in the lookup table module 10. That is, the plurality of reference rotational speeds and the plurality of reference working periods respectively required for the plurality of reference rotational speeds are listed on the lookup table of the lookup table module 10.

The fan may be moved from one environment that is the first embodiment described herein to another environment that is a second environment described herein. Under this condition, the lookup table module 10 updates the reference working periods that are listed on the lookup table such that the updated reference working periods are respectively applicable for driving the motor of the fan to rotate at the plurality of reference rotational speeds in the second environment. The plurality of reference rotational speeds at least includes a first reference rotational speed and a second reference rotational speed that respectively correspond to a first reference working period and a second reference working period that are included in the plurality of reference working periods.

If necessary, the lookup table module 10 may establish a curve diagram as shown in FIG. 5 on the lookup table, set vertical axis values of the curve diagram as the reference rotational speeds, and set horizontal axis values of the curve diagram as the reference working periods. The lookup table module 10 may establish a non-linear curve in the curve diagram based on the reference working periods respectively required for the reference rotational speeds.

For example, the reference rotational speed of 1241.4 RPM corresponds to the reference working period of 12.5%, the reference rotational speed of 2100.8 RPM corresponds to the reference working period of 25%, the reference rotational speed of 2769.2 RPM corresponds to the reference working period of 37.5%, the reference rotational speed of 3533.2 RPM corresponds to the reference working period of 50.0%, the reference rotational speed of 4297.1 RPM corresponds to the reference working period of 62.5%, the reference rotational speed of 4870.1 RPM corresponds to the reference working period of 75.0%, the reference rotational speed of 5538.5 RPM corresponds to the reference working period of 87.5%, and the reference rotational speed of 6016 RPM corresponds to the reference working period of 100%, but the present disclosure is not limited thereto.

In step S105, the driver circuit 40 receives a rotational speed command from an external controller circuit.

In step S107, the driver circuit 40 looks up one of the reference rotational speeds that is equal to a rotational speed instructed by the rotational speed command, from the lookup table.

In step S109, the driver circuit 40 obtains the reference working period required for the reference rotational speed looked up, from the lookup table.

In step S111, the driver circuit 40 outputs the driving signal having the obtained reference working period to the motor of the fan.

In step S113, the motor of the fan is driven to rotate by the driving signal.

In step S115, when the fan is rotating or stops rotating, the fan may be moved to different environments. For the convenience of description, in the embodiment, an environment where the fan is originally located is represented by the first environment, and an environment to which the fan is moved is represented by the second environment. For example, the first environment is in an open space outside a case, and the second environment is an accommodation space in the case inside which the fan is accommodated.

When the fan is moved to the second environment from the first environment and the reference working period is looked up from the non-updated lookup table according to the rotational speed instructed by the rotational speed command, an actual rotational speed of the motor of the fan that is driven in the second environment according to the driving signal having the reference working period looked up is not equal to the rotational speed from the rotational speed command That is, when the fan is moved from the second environment, the driver circuit 40 must adjust the working period of the driving signal outputted to the motor of the fan such that the rotational speed of the motor in the second environment is equal to the rotational speed of the motor of the fan in the first environment.

Therefore, when the fan is moved to the second environment from the first environment, steps S117 to S133 are performed to update the lookup table such that the motor of the fan is quickly driven to rotate.

In step S117, the driver circuit 40 outputs the driving signal to the motor of the fan to drive the motor of the fan to rotate at the first reference rotational speed.

In step S119, the sample and hold circuit 20 samples and holds the working period of the driving signal that is outputted by the driver circuit 40 and used to drive the motor of the fan to rotate at the first reference rotational speed. The sampled working period is represented by a first sampled working period in the embodiment.

In step S121, the arithmetic circuit 30 calculates a difference between the first sampled working period and the first reference working period as a first difference. The motor of the fan is driven to rotate at the first reference rotational speed in the second environment according to the driving signal having the first sampled working period. The motor of the fan is driven to rotate at the first reference rotational speed in the first environment according to the driving signal having the first reference working period as listed on the lookup table. That is, the arithmetic circuit 30 calculates a difference between the working periods of the driving signals respectively for driving the motor of the fan to rotate at a same one of the first reference rotational speeds in different environments.

In step S123, the driver circuit 40 outputs the driving signal to the motor of the fan to drive motor of the fan to rotate at the second reference rotational speed.

In step S125, the sample and hold circuit 20 samples and holds the working period of the driving signal that is outputted by the driver circuit 40 and used to drive the motor of the fan to rotate at the second reference rotational speed. The sampled working period is represented by a second sampled working period in the embodiment.

In step S127, the arithmetic circuit 30 calculates a difference between the second sampled working period and the second reference working period as a second difference. The motor of the fan is driven to rotate at the second reference rotational speed in the first environment according to the driving signal having the second sampled working period. The motor of the fan is driven to rotate at the second reference rotational speed in the second environment according to the driving signal having the second reference working period as listed on the lookup table. That is, the arithmetic circuit 30 calculates a difference between the working periods of the driving signal respectively for driving the motor of the fan to rotate at a same one of the second reference rotational speeds in different environments.

In step S129, the arithmetic circuit 30 determines a linearly changing relationship between the first difference and the second difference to analyze linearly changing data.

In step S131, the arithmetic circuit 30 calculates the plurality of reference working periods respectively required for driving the motor of the fan to rotate at the plurality of reference rotational speeds in the second environment according to the linearly changing data. The lookup table module 10 updates the lookup table according to the calculated reference working periods. The plurality of reference working periods required in the second environment are respectively not equal to the plurality of reference working periods required in the first environment.

In step S133, on the lookup table, the plurality of reference working periods respectively required for the plurality of reference rotational speeds in the first environment are replaced with the plurality of reference working periods respectively required for the plurality of reference rotational speeds in the second environment.

When the lookup table is updated and the motor of the fan rotates in the second environment, the driver circuit 40 receives the rotational speed command in step S105. Then, the driver circuit 40 looks up, from the updated lookup table, the reference working period of the driving signal required for driving the motor of the fan to rotate at the rotational speed instructed by the rotational speed command in steps S107 and S109. Then, the driver circuit 40 outputs the driving signal having the reference working period that is looked up from the updated lookup table to the motor of the fan to drive the motor of the fan to rotate at the rotational speed instructed by the rotational speed command in step S113.

Figure 3:
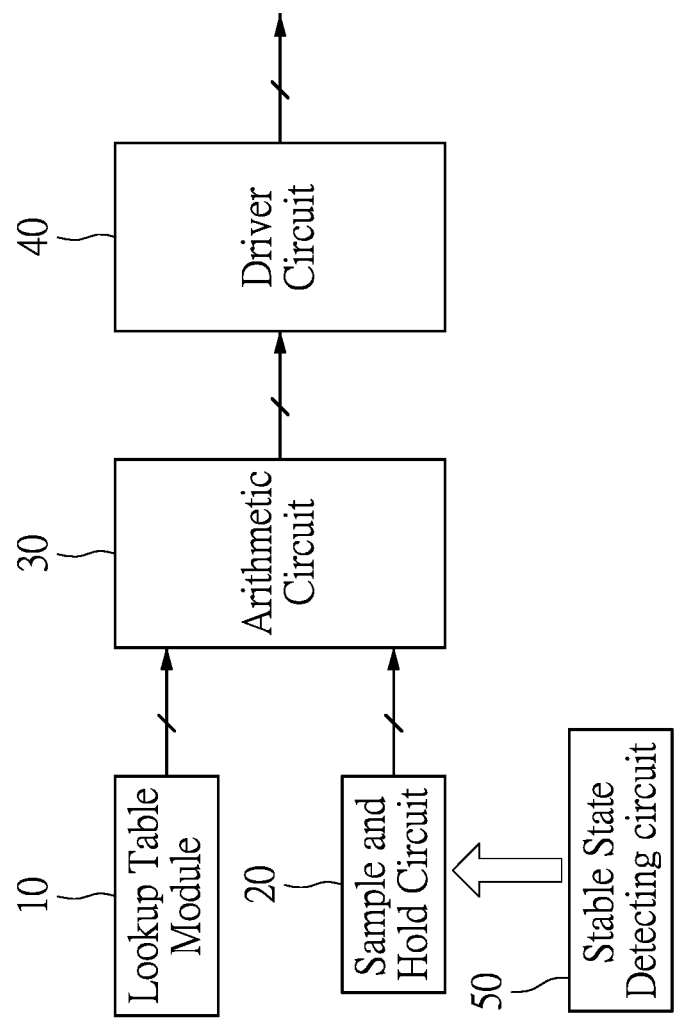
FIG. 3 is a block diagram of a system for automatically correcting a rotational speed of a motor of a fan according to a second embodiment of the present disclosure.
Figure 4:
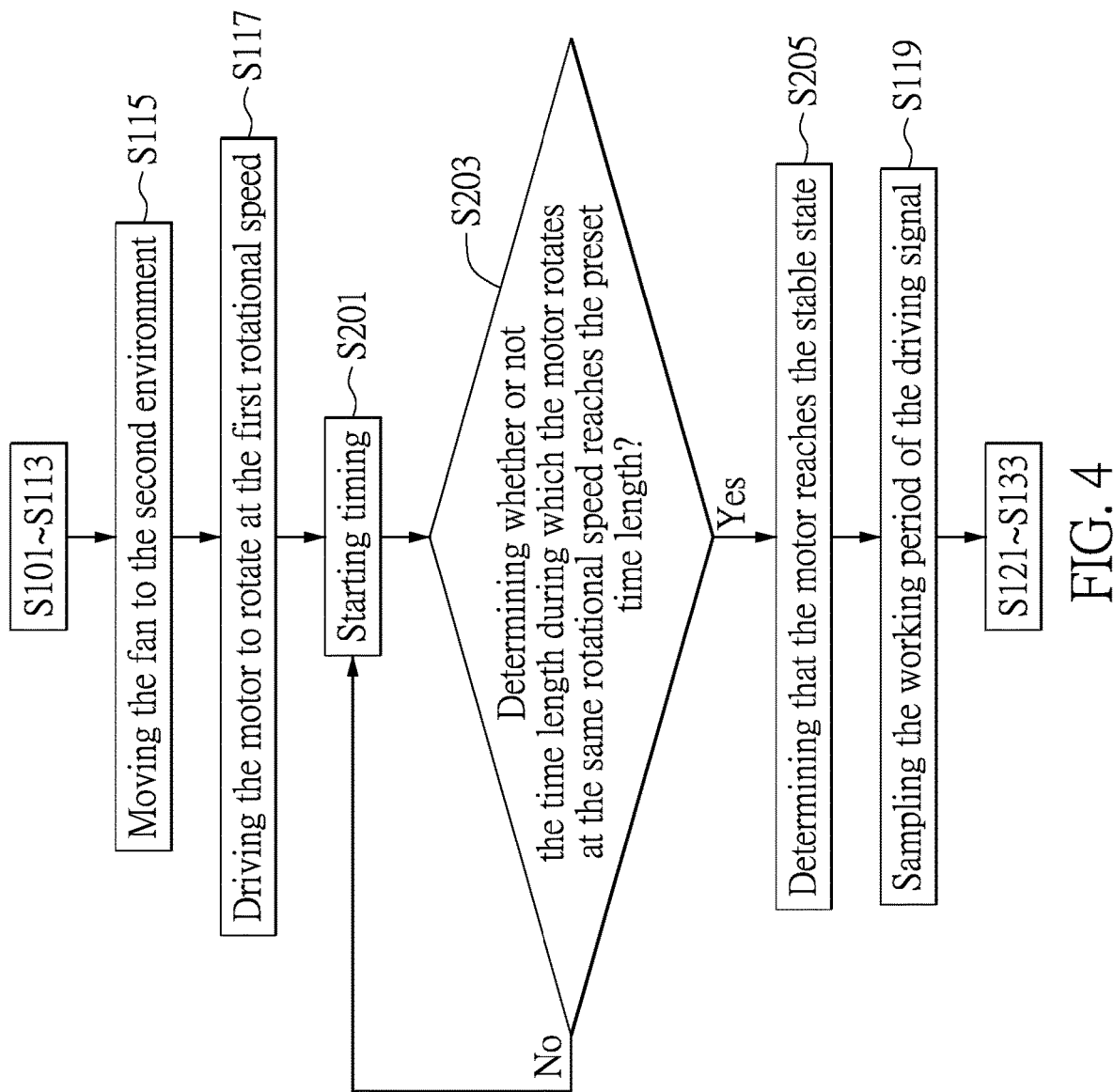
FIG. 4 is a flowchart diagram of a method according to the second embodiment of the present disclosure.
Figure 9:
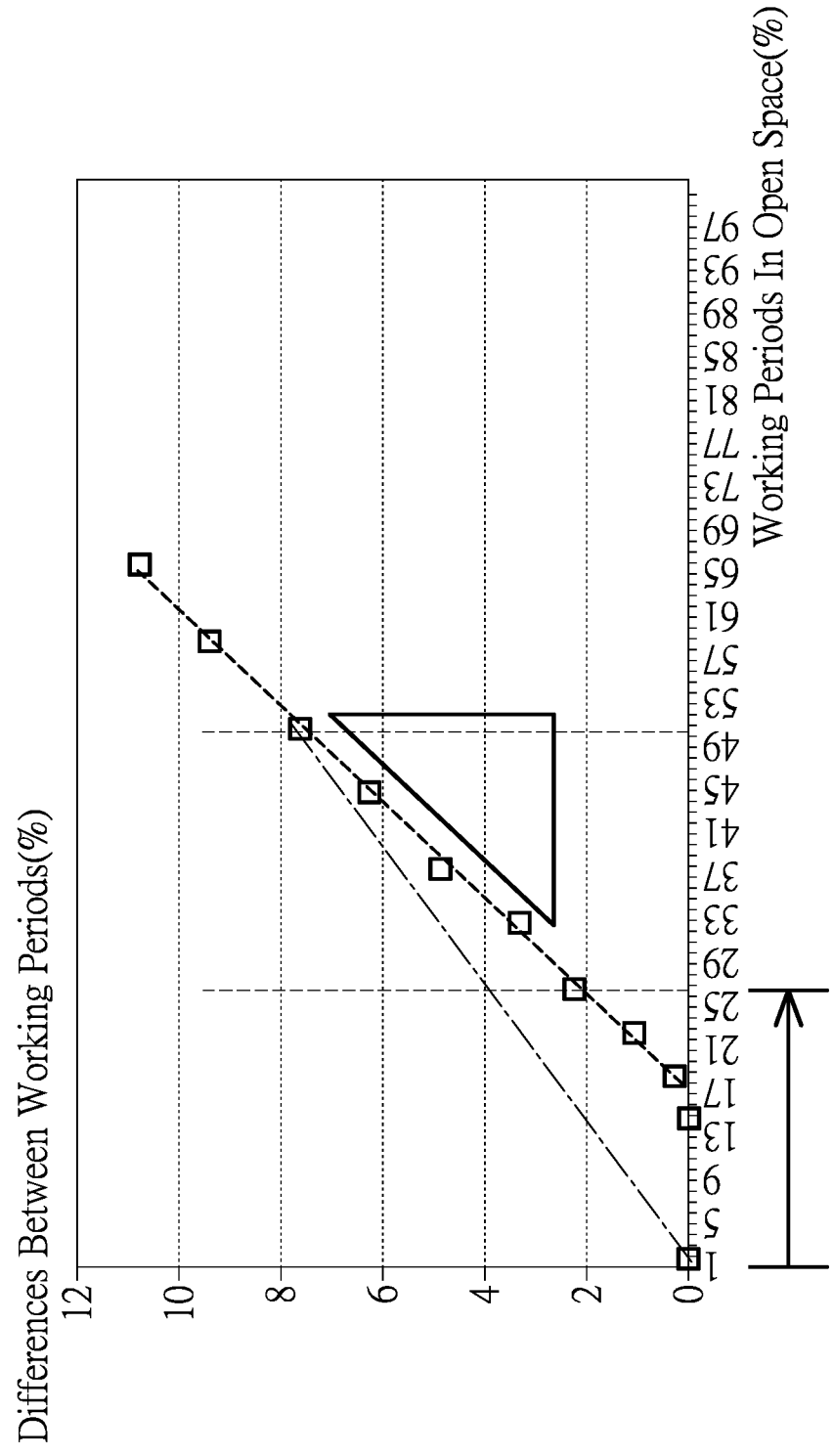
FIG. 9 is a curve diagram of the working periods of the driving signal sampled when the fan of 4 cm reaches a stable state versus the differences between the working periods of the driving signal in the first environment and the working periods of the driving signal in the second environment according to the second embodiment of the present disclosure.

Reference is made to FIGS. 3, 4 and 9, in which FIG. 3 is a block diagram of a system for automatically correcting a rotational speed of a motor of a fan according to a second embodiment of the present disclosure, FIG. 4 is a flowchart diagram of a method according to the second embodiment of the present disclosure, and FIG. 9 is a curve diagram of the working periods of the driving signal sampled when the fan of 4 cm reaches a stable state versus the differences between the working periods of the driving signal in the first environment and the working periods of the driving signal in the second environment according to the second embodiment of the present disclosure.

As shown in FIG. 3, the system for automatically correcting the rotational speed of the motor of the fan may not only include the lookup table module 10, the sample and hold circuit 20, the arithmetic circuit 30, the driver circuit 40, but also include a stable state detecting circuit 50. The system shown in FIG. 3 is applicable for performing steps S101 to S133 and steps S201 and S205 that are included in the method for automatically correcting the rotational speed of the motor of the fan as shown in FIG. 4. It should be understood that, contents and an order of the steps and the number of times of performing the steps may be appropriately adjusted according to actual requirements. As shown in FIG. 1, the stable state detecting circuit 50 is connected to the sample and hold circuit 20. Similar descriptions between the first and second embodiments are not repeated herein.

As shown in FIG. 9, a difference between the working period of the driving signal in the open space and the working period of the driving signal in a closed space linearly increases with an increase in the working period of the driving signal in the open space. However, the motor of the fan may rotate in an unstable state and the rotational speed of the motor may vary for a period of time. For example, the working period of the driving signal sampled when the motor of the fan starts to be driven may not be accurate.

Therefore, after the above-mentioned steps S101 to S117 are performed, steps S201 to S205 may be performed.

In step S201, the stable state detecting circuit 50 times a first time length during which the motor of the fan continually rotates at the first reference rotational speed.

In step S203, the stable state detecting circuit 50 determines whether or not the first time length reaches a first preset time length. If the first time length does not reach the first preset time length such as 6 seconds, the stable state detecting circuit 50 determines that the rotational speed of the motor of the fan changes over time and the motor of the fan rotates in the unstable state. Under this condition, step S201 is performed again to re-time the first time length. Conversely, if the first time length reaches the first preset time length, the stable state detecting circuit 50 determines that the motor of the fan rotates in the stable state. Step S205 is then performed.

In step S205, the stable state detecting circuit 50 instructs the sample and hold circuit 20 to sample and hold the working period of the driving signal by which the motor of the fan is driven to rotate at the first reference rotational speed as the first sampled working period.

After step S123 is performed, steps S201 to S205 may be performed. In step S201, the stable state detecting circuit 50 times a second time length during which the motor of the fan stably and continually rotates at the second reference rotational speed. In step S203, the stable state detecting circuit 50 determines whether or not the second time length reaches a second present time length. If the second time length does not reach the second present time length, the stable state detecting circuit 50 re-times the second time length. If the second time length reaches the second present time length, the stable state detecting circuit 50 instructs the sample and hold circuit 20 to sample and hold the working period of the driving signal for driving the motor of the fan to rotate at the second reference rotational speed as the second sampled working period.

Figure 7:
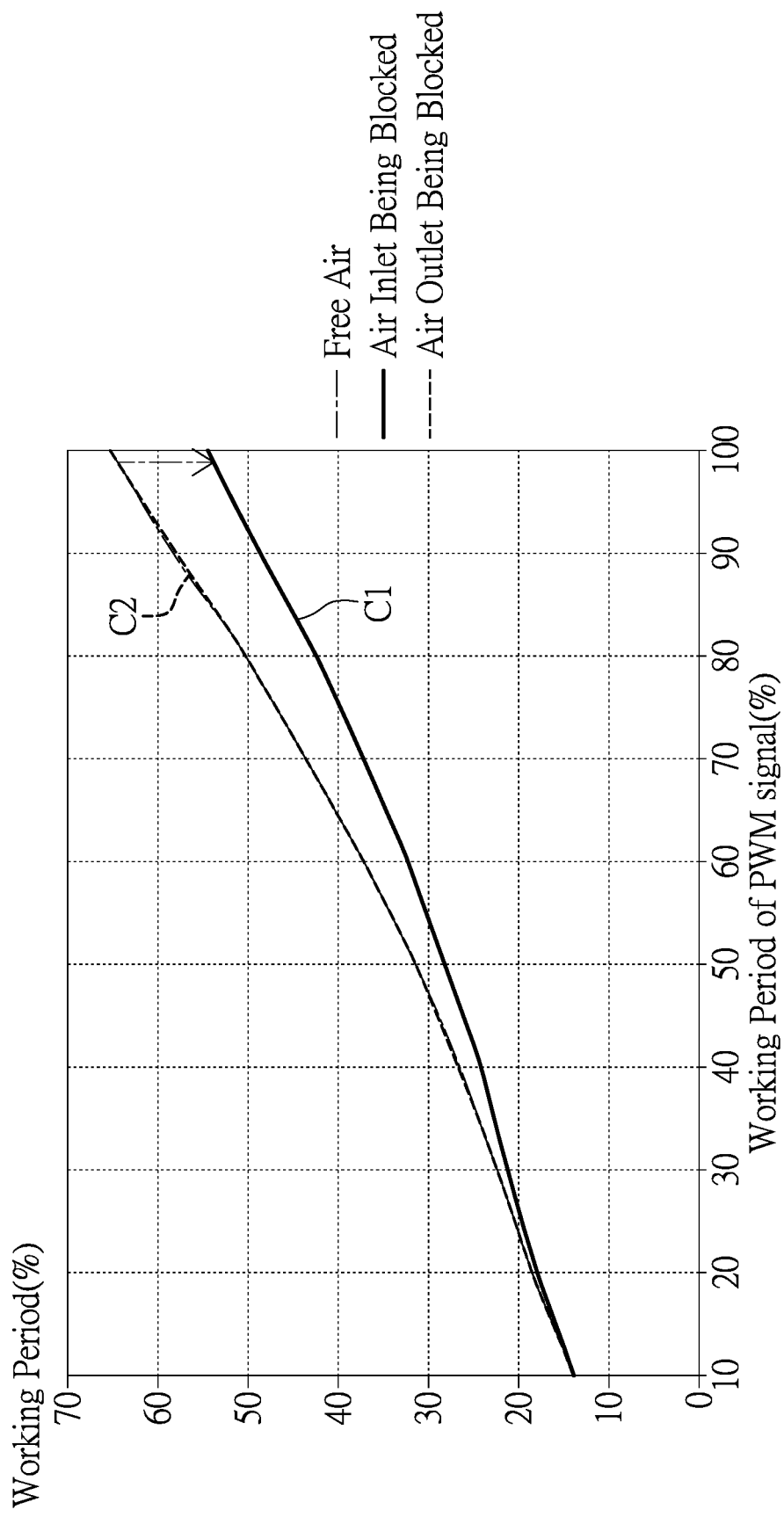
FIG. 7 is a curve diagram of working periods of a driving signal generated by the system and the method for automatically correcting the rotational speed of the motor of the fan that is 4 cm in a case that has an air inlet being blocked versus working periods of a PWM signal according to the first and second embodiments of the present disclosure.
Figure 8:
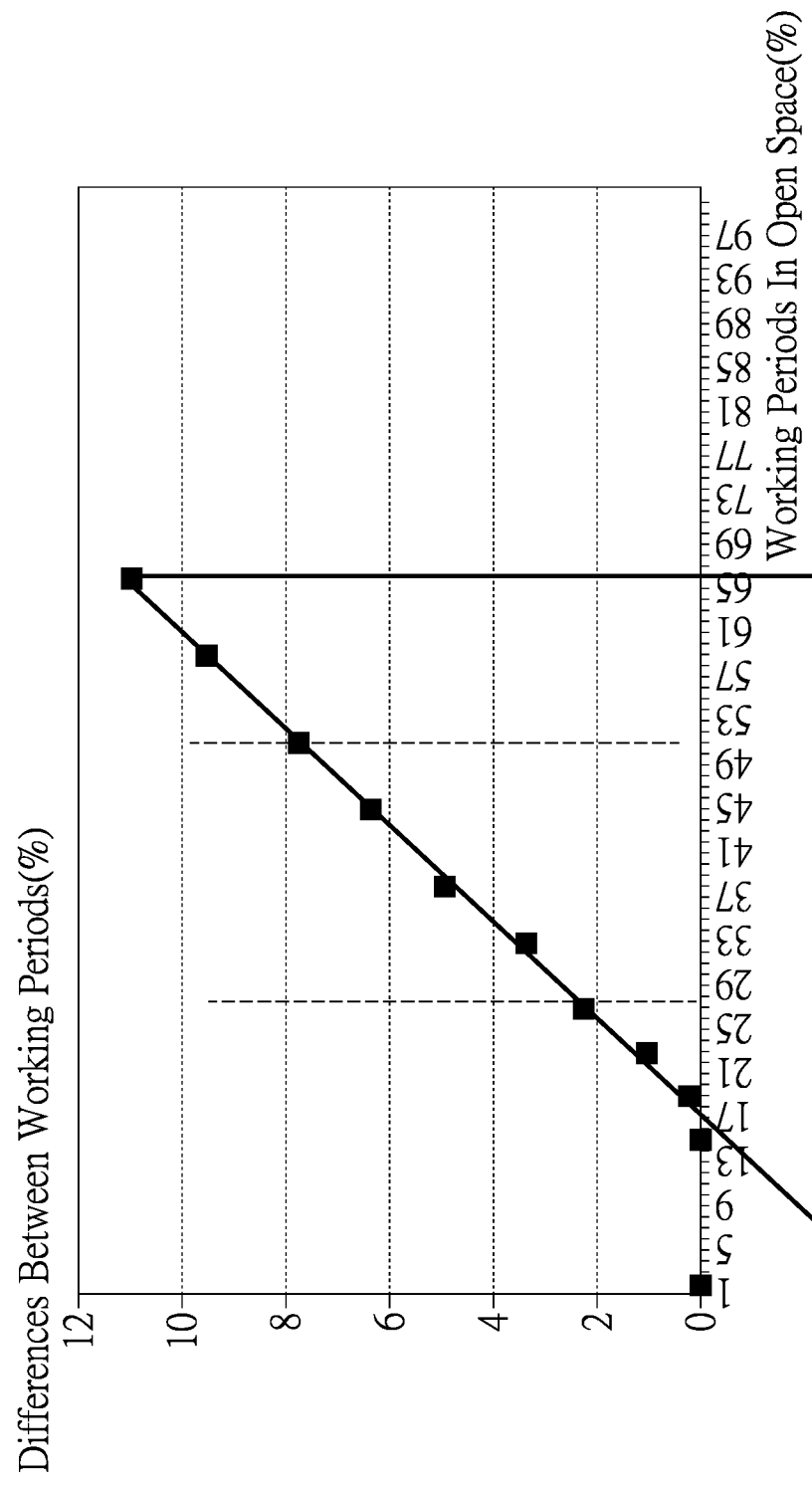
FIG. 8 is a curve diagram of differences between the working periods of the driving signal in a first environment and the working periods of the driving signal in a second environment versus the working periods of the driving signal generated by the system and the method for automatically correcting the rotational speed of the motor of the fan of 4 cm in the first environment according to the first embodiment of the present disclosure.
Figure 10:
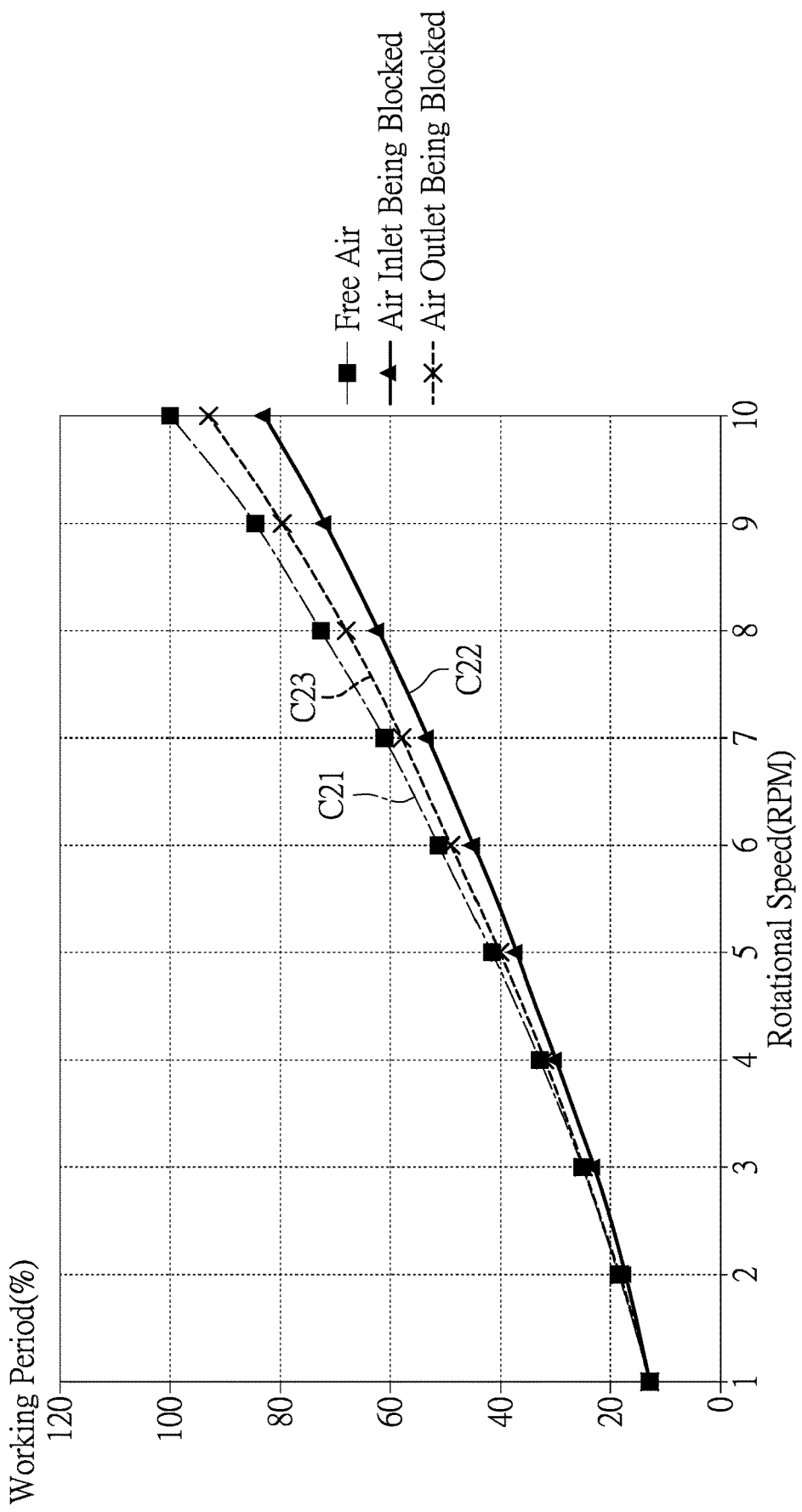
FIG. 10 is a curve diagram of the working periods of the driving signal generated by the system and the method for automatically correcting the rotational speed of the motor of the fan of 6 cm in different environments versus rotational speeds of the fan according to the first and second embodiments of the present disclosure.
Figure 11:
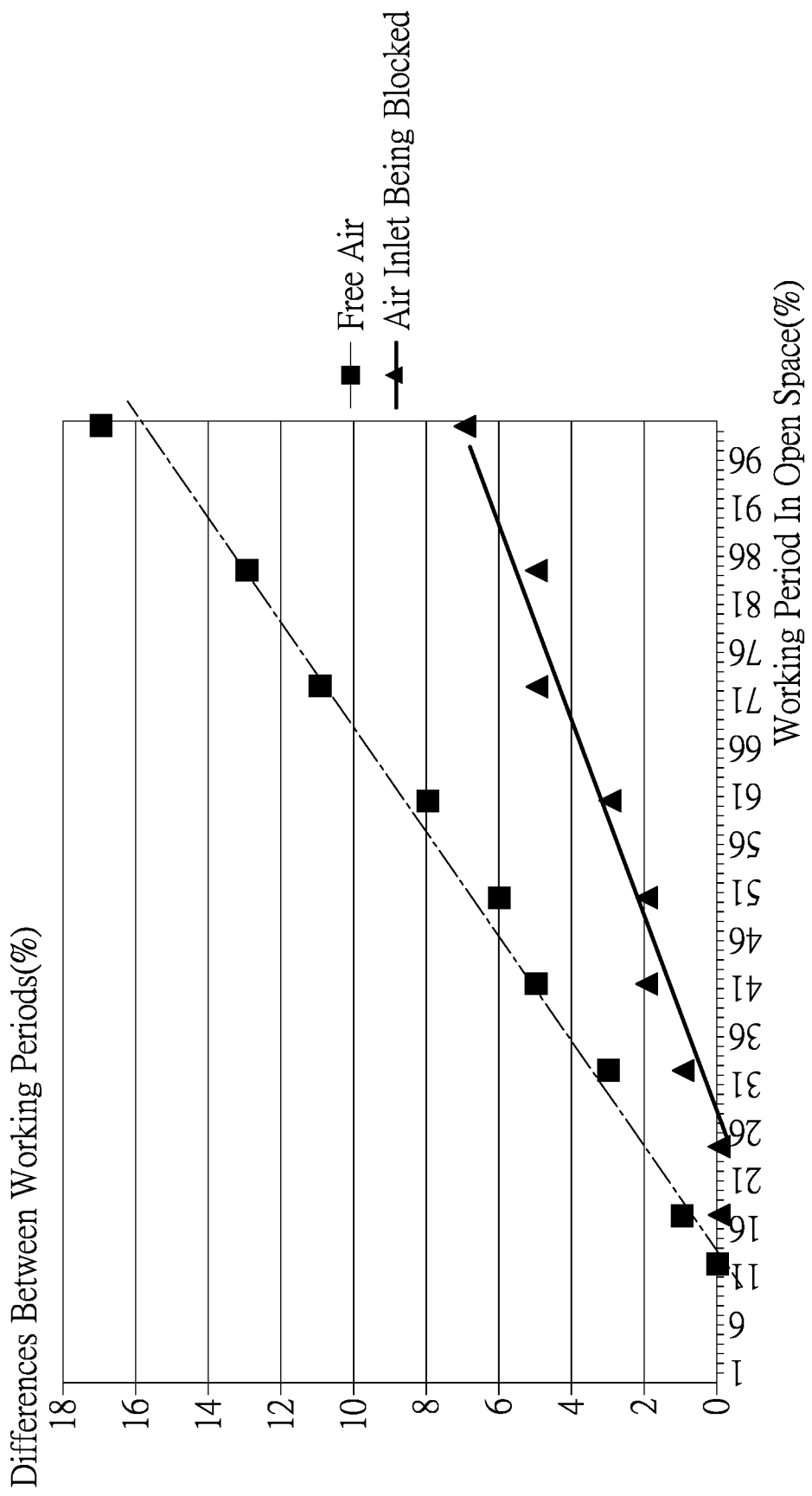
FIG. 11 is a curve diagram of differences between the working periods of the driving signal in the first environment and the working periods of the driving signal in the second environment versus the working periods of the driving signal generated by the system and the method for automatically correcting the rotational speed of the motor of the fan of 6 cm in the first environment according to the first and second embodiments of the present disclosure.

Reference is made to FIGS. 1 to 11, in which FIG. 8 is a curve diagram of differences between the working periods of the driving signal in a first environment and the working periods of the driving signal in a second environment versus the working periods of the driving signal generated by the system and the method for automatically correcting the rotational speed of the motor of the fan of 4 cm in the first environment according to the first embodiment of the present disclosure, FIG. 9 is a curve diagram of the working periods of the driving signal sampled when the fan of 4 cm reaches a stable state versus the differences between the working periods of the driving signal in the first environment and the working periods of the driving signal in the second environment according to the second embodiment of the present disclosure, and FIG. 11 is a curve diagram of differences between the working periods of the driving signal in the first environment and the working periods of the driving signal in the second environment versus the working periods of the driving signal generated by the system and the method for automatically correcting the rotational speed of the motor of the fan of 6 cm in the first environment according to the first and second embodiments of the present disclosure.

As shown in FIG. 6, the working periods of the driving signals that are outputted to the motor of fan by the driver circuit 40 and used to drive the motor to rotate at a same one of rotational speeds respectively in the open space and in the closed space of the case are not equal to each other. The case has an air inlet or an air outlet that is blocked and the motor of the fan is accommodated inside the case.

Data shown in FIG. 6 is marked in the curve diagram of FIG. 7. A first curve C1 and a second curve C2 are formed based on the data in the curve diagram of FIG. 7. Horizontal axis values of the curve diagram are working periods of a PWM signal. A frequency at which the driver circuit 40 drives the motor of the fan depends on the working periods of the PWM signal. The working periods of the PWM signal is proportional to the rotational speeds of the motor of the fan. Vertical axis values of the curve diagram are the working periods of the driving signal inputted to the motor of the fan. The first curve C1 represents a data curve sampled when the air inlet of the case is blocked. The second curve C2 represents a data curve sampled when the air outlet of the case is blocked.

As shown in FIG. 7, the first curve C1 and the second curve C2 of the working periods of the driving signal of the fan of 4 cm versus the working periods of the PWM signal are non-linear curves. As shown in FIG. 10, a curve of the working periods of the driving signal of the fan of 6 cm versus the rotational speed of the motor of the fan is also a non-linear curve.

However, it is worth noting that, when the motor of the fan rotates at a same one of the reference rotational speeds, the working period of the driving signal inputted to the motor of the fan in the open space is proportional to a difference between the working period of the driving signal inputted to the motor of the fan in the open space and the working period of the driving signal inputted to the motor of the fan in the case having the blocked air inlet. As shown in FIGS. 8, 9 and 10, said curves are linear curves.

Therefore, as described in the above step S131, the sample and hold circuit 20 may sample working periods of two driving signals that are the first sampled working period and the second sampled working period in the second environment. The arithmetic circuit 30 may calculate the reference working periods of the driving signal respectively required for driving the motor of the fan to rotate respectively at other speeds of the plurality of reference rotational speeds in the second environment, based on data of the linear curves having linear characteristics that is the above-mentioned linearly changing data. The lookup table module 10 updates the lookup table according to the calculated reference working periods.

For the convenience of explanation, in the embodiment, the working period of the driving signal inputted to the motor of the fan in the first environment is represented by the reference working period, and the working period of the driving signal inputted to the motor of the fan in the second environment is represented by the sampled working period.

The arithmetic circuit 30 calculates a difference between the first sampled working period and the first reference working period as the first difference, and generates a first equation according to the first difference and the first reference working period as follows:

$$y_1 = a \times x_1 + b,$$

wherein $y_1$ represents the first difference, $x_1$ represents the first reference working period, a represents a first coefficient, and b represents a second coefficient.

The arithmetic circuit 30 calculates a difference between the second sampled working period and the second reference working period as the second difference, and generates a second equation according to the second difference and the second reference working period as follows:

$$y_2 = a \times x_2 + b,$$

wherein $y_2$ represents the second difference, $x_2$ represents the second reference working period, a represents a first coefficient, and b represents a second coefficient.

Then, the arithmetic circuit 30 subtracts the second equation from the first equation to calculate the first coefficient, substitutes the first coefficient into the first equation or the second equation to calculate the second coefficient, and generates a common equation based on the first coefficient and the second coefficient as follows:

$$y = a \times x + b,$$

wherein y represents a difference between the reference working period required in the first environment and the reference working period required in the second environment, x represents the reference working period required in the first environment, a represents the first coefficient, and b represents the second coefficient.

The arithmetic circuit 30 substitutes each of the reference working periods of the driving signals respectively required for driving the motor of the fan to rotate at the reference rotational speeds in the first environment as listed on the lookup table into the common equation. As a result, the arithmetic circuit 30 calculates each of the reference working periods of the driving signals required for driving the motor of the fan to continually rotate at the same one of reference rotational speeds after the fan is moved to the second environment from the first environment.

For example, as shown in FIG. 6, when the driver circuit 40 drives the motor of the fan to rotate at a target rotational speed of 16000 RPM in the first environment, the driver circuit 40 looks up the reference working period of 50.5% corresponding to the target rotational speed of 16000 RPM from the lookup table of the lookup table module 10 that is not updated yet. The sample and hold circuit 20 samples and holds the working period of the driving signal by which the motor of the fan is driven to rotate at the same target rotational speed of 16000 RPM in the second environment. The sampled working period of the driving signal is 42.7%.

The arithmetic circuit 30 calculates a difference between the reference working period of 50.5% in the first environment and the sampled working period of 42.7% in the second environment. The calculated difference is 7.8%. Then, the arithmetic circuit 30 substitutes the difference as a y value and the reference working period of 50.5% in the first environment as a x value into the above-mentioned common equation to form a first formula as follows:

$$7.8 = a \times 50.5 + b.$$

In addition, when the driver circuit 40 drives the motor of the fan to rotate at a target rotational speed of 8000 RPM, the driver circuit 40 looks up the reference working period of 26.7% corresponding to the target rotational speed of 8000 RPM from the lookup table that is not updated yet. The sample and hold circuit 20 samples and holds the working period of the driving signal by which the motor of the fan is driven to rotate at the same target rotational speed of 8000 RPM in the second environment. The sampled working period of the driving signal is 24.4%.

The arithmetic circuit 30 calculates a difference between the reference working period of 26.7% in the first environment and the sampled working period of 24.4% in the second environment. The difference is 2.3%. Then, the arithmetic circuit 30 substitutes the difference as a y value and the reference working period of 26.7% as an x value into the above-mentioned common equation to form a second formula as follows:

$$2.3 = a \times 26.7 + b.$$

Then, the arithmetic circuit 30 subtracts the second equation from the first equation to calculate the first coefficient of 0.231. Then, the arithmetic circuit 30 substitutes the first coefficient into the first formula or the second formula to calculate the second coefficient of −3.87. The arithmetic circuit 30 substitutes the first coefficient and the second coefficient into the common equation to generate an equation: $y=0.231 \times x - 3.87$ that is applicable in the second environment. The arithmetic circuit 30 calculates the reference working periods of the driving signals respectively required for driving the motor of the fan to rotate at other speeds of the plurality of reference rotational speeds in the second environment, based on the equation that is applicable in the second environment. The lookup table module 10 updates the lookup table according to the calculated the reference working periods.

In summary, the present disclosure provides the system and the method for automatically correcting the rotational speed of the motor of the fan. When the fan is moved from one environment to another environment, the working periods of the driving signals respectively required for driving the motor of the fan to rotate at different rotational speeds are automatically corrected on the lookup table. Therefore, no matter where the fan is moved to, the corrected lookup table can be directly looked up according to the rotational speed instructed by the rotational speed command, and the driving signal having the working period looked up from the corrected lookup table is quickly outputted. The motor of the fan is driven to rotate at the target rotational speed by the driving signal.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for automatically correcting a rotational speed of a motor of a fan, comprising:
   a driver circuit connected to the motor of the fan, wherein a plurality of reference working periods that are respectively required for driving the motor of the fan to rotate at a plurality of reference rotational speeds in a first environment are listed on a lookup table, the plurality of reference working periods include a first reference working period and a second reference working period that respectively correspond to a first reference rotational speed and a second reference rotational speed that are included in the plurality of reference rotational speeds, the driver circuit is configured to look up one of the reference working periods that corresponds to the reference rotational speed being equal to a rotational speed instructed by a rotational speed command, and the driver circuit is configured to output a driving signal having the one of the reference working periods that is looked up from the lookup table to the motor of the fan;
   a sample and hold circuit connected to the driver circuit and the motor of the fan, wherein the sample and hold circuit is configured to sample and hold a working period of the driving signal by which the motor of the fan is driven to rotate at the first reference rotational speed in a second environment as a first sampled working period, and the sample and hold circuit is configured to sample and hold a working period of the driving signal by which the motor of the fan is driven to rotate at the second reference rotational speed in the second environment as a second sampled working period; and
   an arithmetic circuit connected to the sample and hold circuit and the driver circuit, wherein the arithmetic circuit is configured to calculate a difference between the first sampled working period and the first reference working period as a first difference, the arithmetic circuit is configured to calculate a difference between the second sampled working period and the second reference working period as a second difference, the arithmetic circuit is configured to determine a linearly changing relationship between the first difference and the second difference to analyze linearly changing data, the arithmetic circuit is configured to calculate the plurality of reference working periods respectively required for driving the motor of the fan to rotate at the plurality of reference rotational speeds in the second environment based on the linearly changing data, and the arithmetic circuit is configured to update the lookup table according to the reference working periods that are calculated.

2. The system according to claim 1, wherein the arithmetic circuit is configured to generate a first equation according to the first difference and the first reference working period as follows:

$$y1=a\times x1+b,$$

wherein y1 represents the first difference, x1 represents the first reference working period, a represents a first coefficient, and b represents a second coefficient;
wherein the arithmetic circuit is configured to generate a second equation according to the second difference and the second working period as follows:

$$y2=a\times x2+b,$$

wherein y2 represents the second difference, and x2 represents the second reference working period;
wherein the arithmetic circuit is configured to subtract the second equation from the first equation to calculate the first coefficient, substitute the first coefficient into the first equation or the second equation to calculate the second coefficient, and generate a common equation based on the first coefficient and the second coefficient as follows:

$$y=a\times x+b,$$

wherein y represents a difference between the reference working period required in the first environment and the reference working period required in the second environment, and x represents the reference working period required in the first environment;
wherein the arithmetic circuit is configured to substitute each of the reference working periods respectively required for driving the motor of the fan to rotate at the reference rotational speeds in the first environment into the common equation to calculate each of the reference working periods respectively required for driving the motor of the fan to rotate at the reference rotational speeds in the second environment.

3. The system according to claim 2, wherein the arithmetic circuit is configured to set the x's respectively at the plurality of reference rotational speeds as horizontal axis values of a curve diagram, set the y's respectively at the plurality of reference rotational speeds as vertical axis values of the curve diagram, and generate a linear curve in the curve diagram based on all of the x's and the y's at the plurality of reference rotational speeds.

4. The system according to claim 1, wherein the working period of the driving signal by which the motor of the fan is driven to rotate at a same one of the reference rotational speeds is sampled by the sample and hold circuit sequentially at a first time point and a second time point, and when the sample and hold circuit determines that the working period of the driving signal sampled at the first time point is not equal to the working period of the driving signal sampled at a second time point, the sample and hold circuit determines that an environment where the fan is located is changed and instructs the arithmetic circuit to update the lookup table.

5. The system according to claim 1, further comprising:
a stable state detecting circuit connected to the sample and hold circuit, wherein the stable state detecting circuit is configured to time a first time length during which the motor of the fan stably and continually rotates at the first reference rotational speed, and when the stable state detecting circuit determines that the first time length reaches a first preset time length, the stable state detecting circuit determines that the motor of the fan reaches a stable state and accordingly instructs the sample and hold circuit to sample and hold the first sampled working period;
wherein the stable state detecting circuit is configured to time a second time length during which the motor of the fan stably and continually rotates at the second reference rotational speed, and when the stable state detecting circuit determines that the second time length reaches a second preset time length, the stable state detecting circuit determines that the motor of the fan reaches the stable state and accordingly instructs the sample and hold circuit to sample and hold the second sampled working period.

6. The system according to claim 1, wherein the first environment includes an open space, and the second environment includes a closed space in a case inside which the motor of the fan is located.

7. A method for automatically correcting a rotational speed of a motor of a fan, comprising the following steps:
storing, in a lookup table, a plurality of reference working periods respectively required for driving the motor of the fan to rotate at a plurality of reference rotational speeds in a first environment, wherein the plurality of reference working periods include a first reference working period and a second reference working period that respectively correspond to a first reference rotational speed and a second reference rotational speed that are included in the plurality of reference rotational speeds;
receiving a rotational speed command;
in the first environment, looking up, from the lookup table, one of the reference working periods that corresponds to the reference rotational speed being equal to a rotational speed instructed by a rotational speed command, and outputting a driving signal having the one of the reference working periods that is looked up from the lookup table to the motor of the fan;
sampling and holding a working period of the driving signal by which the motor of the fan is driven to rotate at the first reference rotational speed in a second environment as a first sampled working period;
calculating a difference between the first sampled working period and the first reference working period as a first difference;
sampling and holding a working period of the driving signal by which the motor of the fan is driven to rotate at the second reference rotational speed as a second sampled working period;
calculating a difference between the second sampled working period and the second reference working period as a second difference;
determining a linearly changing relationship between the first difference and the second difference to analyze linearly changing data;
calculating, based on the linearly changing data, the plurality of reference working periods respectively required for driving the motor of the fan to rotate at the plurality of reference rotational speeds in the second environment, and updating the lookup table according to the plurality of reference working periods calculated; and
in the second environment, looking up, from the lookup table that is updated, one of the reference working periods that corresponds to the reference rotational speed being equal to the rotational speed instructed by the rotational speed command, and outputting the driving signal having the one of the reference working periods that is looked up from the lookup table to the motor of the fan.

8. The method according to claim 7, further comprising the following steps:

generating a first equation according to the first difference and the first reference working period as follows:

$$y1 = a \times x1 + b,$$

wherein y1 represents the first difference, x1 represents the first reference working period, a represents a first coefficient, and b represents a second coefficient;

generating a second equation according to the second difference and the second reference working period as follows:

$$y2 = a \times x2 + b,$$

wherein y2 represents the second difference, and x2 represents the second reference working period;

subtracting the second equation from the first equation to calculate the first coefficient, substituting the first coefficient into the first equation or the second equation to calculate the second coefficient, and generating a common equation based on the first coefficient and the second coefficient as follows:

$$y = a \times x + b,$$

wherein y represents a difference between the reference working period required in the first environment and the reference working period required in the second environment, and x represents the reference working period required in the first environment; and substituting each of the reference working periods respectively required for driving the motor of the fan to rotate at the plurality of reference rotational speeds in the first environment into the common equation to calculate each of the reference working periods respectively required for driving the motor of the fan to rotate at the plurality of reference rotational speeds in the second environment.

9. The method according to claim 8, further comprising the following step:

setting the x respectively at the plurality of reference rotational speeds as horizontal axis values of a curve diagram, setting the y respectively at the plurality of reference rotational speeds as vertical axis values of the curve diagram, and generating a linear curve in the curve diagram based on all of the x and the y at the plurality of reference rotational speeds.

10. The method according to claim 7, further comprising the following steps:

sampling and holding, at a first time point, the working period of the driving signal by which the motor of the fan is driven to rotate at one of the reference rotational speeds;

sampling and holding, at a second time point, the working period of the driving signal by which the motor of the fan is driven to rotate at the one of the reference rotational speeds; and determining whether or not the working period sampled at the first time point is equal to the working period sampled at a second time point, in response to determining that the working period sampled at the first time point is not equal to the working period sampled at the second time point, determining that an environment where the fan is located is changed and instructing the arithmetic circuit to update the lookup table, and in response to determining that the working period sampled at the first time point is equal to the working period sampled at the second time point, not updating the lookup table.

11. The method according to claim 7, further comprising the following steps:

timing a first time length during which the motor of the fan stably and continually rotates at the first reference rotational speed;

determining whether or not the first time length reaches a first preset time length, in response to determining that the first time length reaches the first preset time length, determining that the motor of the fan reaches a stable state, and sampling and holding the first sampled working period, and in response to determining that the first time length does not reach the first preset time length, re-timing the first time length;

timing a second time length during which the motor of the fan stably and continually rotates at the second reference rotational speed; and determining whether or not the second time length reaches a second preset time length, in response to determining that the second time length reaches the second preset time length, determining that the motor of the fan reaches the stable state, and sampling and holding the second sampled working period, and in response to determining that the second time length does not reach the second preset time length, re-timing the second time length.

* * * * *